(12) United States Patent
González Penedo et al.

(10) Patent No.: US 8,351,669 B2
(45) Date of Patent: Jan. 8, 2013

(54) METHOD, APPARATUS, AND SYSTEM FOR RETINAL IMAGE ANALYSIS

(75) Inventors: Manuel F. González Penedo, Santiago de Compostela (ES); Noelia Barreira Rodriguez, A Coruña (ES); Marcos Ortega Hortas, A Coruña (ES); Antonio Mosquera González, A Coruña (ES); Maria Jose Carreira Nouche, Santiago de Compostela (ES); Francisco Gomez-Ulla de Irazazabal, A Coruña (ES); Antonio Pose Reino, Santiago de Compostela (ES)

(73) Assignees: Universidade da Coruna-Otri, A Coruna (ES); Universidade de Santiago de Compostela, Santiago de Compostela (ES); Servicio Galego de Saude (Sergas), Santiago de Compostela (ES)

( * ) Notice: Subject to any disclaimer, the term of this patent is extended or adjusted under 35 U.S.C. 154(b) by 143 days.

(21) Appl. No.: 13/018,430

(22) Filed: Feb. 1, 2011

(65) Prior Publication Data

US 2012/0195480 A1 Aug. 2, 2012

(51) Int. Cl.
*G06K 9/00* (2006.01)
*A61B 3/14* (2006.01)

(52) U.S. Cl. .......................... 382/128; 382/224; 351/206

(58) Field of Classification Search ................. 382/100, 382/103, 107, 115, 117, 128, 129, 130, 131, 382/132, 133, 134, 156, 162, 168, 173, 181, 382/224, 232, 254, 274, 276, 285–299, 305, 382/312, 321; 351/206
See application file for complete search history.

(56) References Cited

U.S. PATENT DOCUMENTS

| 5,311,600 | A  | * | 5/1994 | Aghajan et al. | 382/156 |
| 7,524,061 | B2 | * | 4/2009 | Yan et al. | 351/206 |
| 7,583,827 | B2 | * | 9/2009 | Hansen et al. | 382/128 |
| 7,715,626 | B2 | * | 5/2010 | Florin et al. | 382/173 |
| 7,992,999 | B2 | * | 8/2011 | Xu et al. | 351/206 |

* cited by examiner

*Primary Examiner* — Seyed Azarian
(74) *Attorney, Agent, or Firm* — Mateo Aboy; Aboy&Associates PC

(57) ABSTRACT

Disclosed embodiments include a method for retinal image analysis implemented in a medical system with one or more processors comprising the method steps of: (a) locating an optical disk on the retinal images and establishing a plurality of circumferences centered at the disk; (b) detecting a plurality of vessels within a region defined by said circumferences' radii using a crease-based algorithm; (c) extracting a plurality of vessel segments based on a deformable models (snakes) algorithm; (d) measuring a plurality of vessel calibers; (e) classifying each vessel as a vein and an artery; and (f) computing an arteriolar-to-venular ratio.

13 Claims, 9 Drawing Sheets

METHOD, APPARATUS, AND SYSTEM FOR RETINAL IMAGE ANALYSIS

TECHNICAL FIELD

Disclosed embodiments relate to methods, apparatus, and systems for medical image analysis. Specifically, they relate to methods, apparatus, and systems for retinal image analysis.

BACKGROUND

Analysis of blood vessels from retinal images has clinical significance since retinal blood vessels are the first ones that show the symptoms of several pathologies, such as arterial hypertension, arteriosclerosis, and other systemic vascular diseases.

In order to detect such symptoms and to perform diagnosis, it is typically required to perform a series of image processing tasks. Currently available retinal analysis systems require significant manual input from the medical personnel, are subjective, and analysis is time-consuming and prone to error. Accurate, objective, reliable, and automatic (or semi-automatic) retinal image medical systems are currently not available with the performance required for routine clinical use.

As an example, the computation of the retina arteriovenous ratio (AVR), that is, the relation between afferent and efferent blood vessels of the retinal vascular tree, is significant in order to diagnose diseases and evaluate their consequences. Due to the unavailability of commercial retinal image analysis systems with precise and robust estimation of the AVR metric, analysis of the AVR is usually computed by a tedious and time consuming manual process. This the results in more expensive, subjective, and ophthalmologist-dependent AVR computations. Similarly, other clinical parameters derived from retinal image analysis are tedious and their manual computation is subjective.

SUMMARY

Disclosed embodiments include a method for analysis of retinal images implemented in a medical apparatus or system including functionality for 1) locating optical disks in retinal images, 2) detecting vessels, 3) extracting vessels, 4) measuring vessel calibers, 5) classifying vessels, and 6) computing a plurality of clinical parameters.

According to one embodiment, and without limitation, the method is implemented in a medical system with one or more processors and comprises the method steps of: (a) locating an optical disk on the retinal images and establishing a plurality of circumferences centered at the disk; (b) detecting a plurality of vessels within a region defined by said circumferences' radii using a crease-based algorithm; (c) extracting a plurality of vessel segments based on a deformable models (snakes) algorithm; (d) measuring a plurality of vessel calibers; (e) classifying each vessel as a vein and an artery; and (f) computing an arteriolar-to-venular ratio.

BRIEF DESCRIPTION OF THE DRAWINGS

Disclosed embodiments are illustrated by way of example, and not by way of limitation, in the figures of the accompanying drawings.

DETAILED DESCRIPTION

Figure 1:
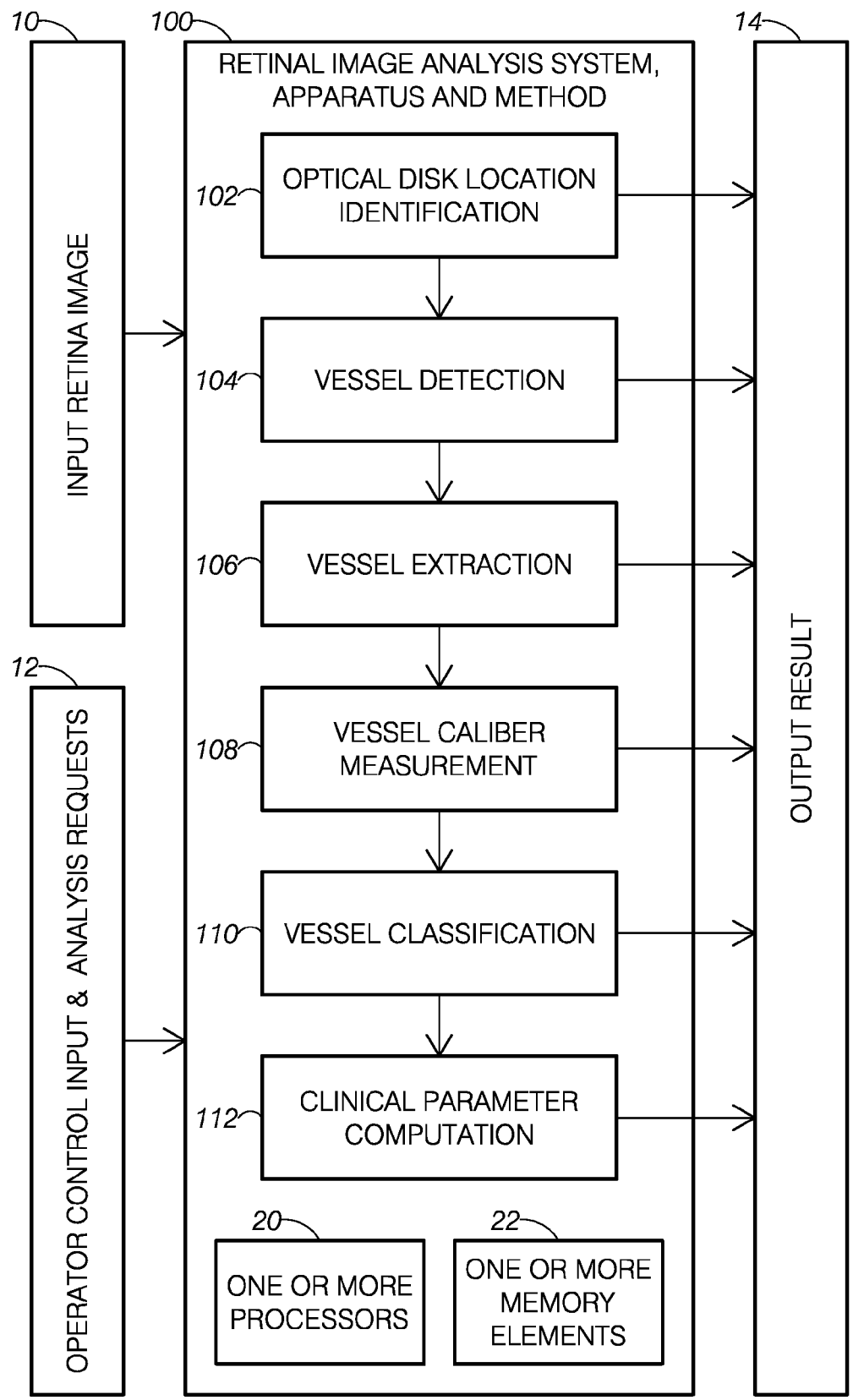
FIG. 1 shows a general block diagram of the system, apparatus, and method according to one embodiment.

As shown in FIG. 1, disclosed embodiments include a method for analysis of retinal images implemented in a medical apparatus or system with one or more processors 20 and one or more memory elements 22 in order to locate optical disks in retinal images 102, detect vessels 104, extract vessels 106, measure vessel calibers 108, classify vessels 110, and compute a plurality of clinical parameters 112. According to one embodiment, and without limitation, such clinical parameters include the computation of the arteriolar-to-venular ratio (AVR). The retinal analysis method takes a retina image 10 and the operator instructions 12 as an input and produces output result selected among the outputs of each method step.

According to one embodiment as shown in FIG. 1, and without limitation, the method is implemented in a medical system with one or more processors and comprises the method steps of: (a) locating an optical disk on the retinal images and establishing a plurality of circumferences centered at the disk 102; (b) detecting a plurality of vessels within a region defined by said circumferences' radii using a crease-based algorithm 104; (c) extracting a plurality of vessel segments based on a deformable models (snakes) algorithm 106; (d) measuring a plurality of vessel calibers 108; (e) classifying each vessel as a vein and an artery 110; and (f) computing an arteriolar-to-venular ratio 112.

Figure 2:
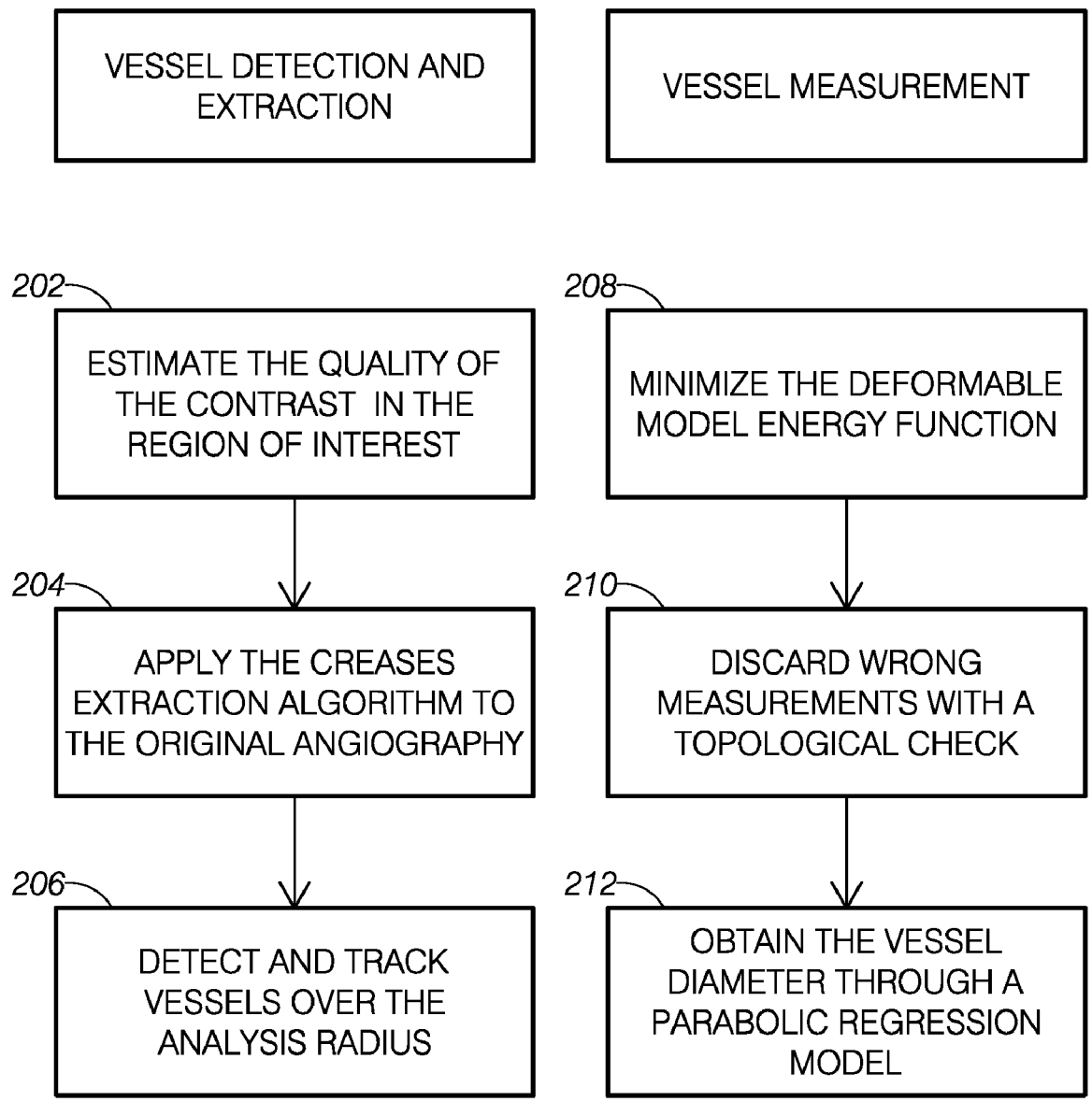
FIG. 2 shows a block diagram of the method for vessel detection and extraction, and the method for vessel measurement according to one embodiment.
Figure 3:
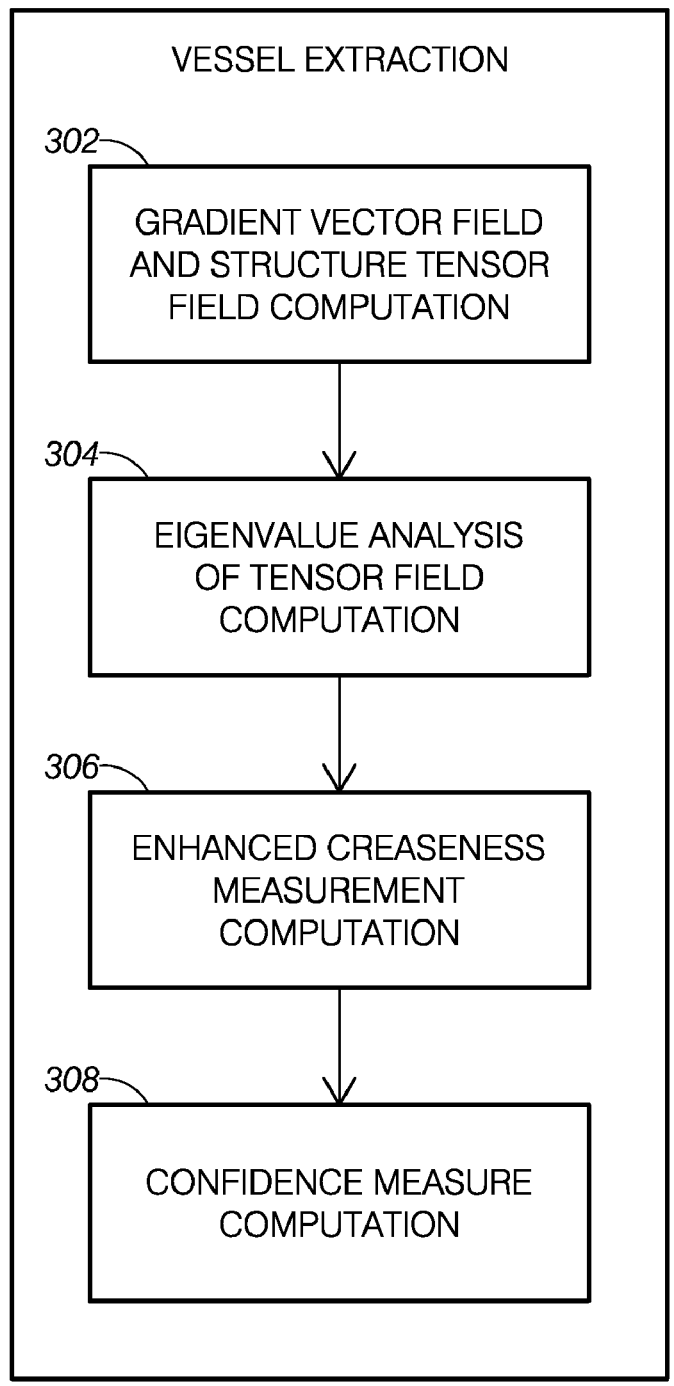
FIG. 3 shows a block diagram of a particular method for vessel extraction.

FIG. 2 shows a block diagram of the method for vessel detection and extraction, and the method for vessel measurement according to one embodiment. According to this particular embodiment, and without limitation, the vessel extraction algorithm comprises 1) estimating the quality of the contrast in the region of interest 202, 2) applying a creases extraction algorithm to the original angiography 204, and 3) detecting and tracking vessels over the analysis radius 206; and the vessel measurement algorithm comprises 1) minimizing a deformable model energy function 208, 2) discarding wrong measurements based on a topological check 210, and 3) obtaining the vessel diameter through a parabolic regression model 212. FIG. 3 shows a block diagram of a particular method for vessel extraction.

A. Locating the Optical Disk and Analysis Circumference Radius

Figure 4:
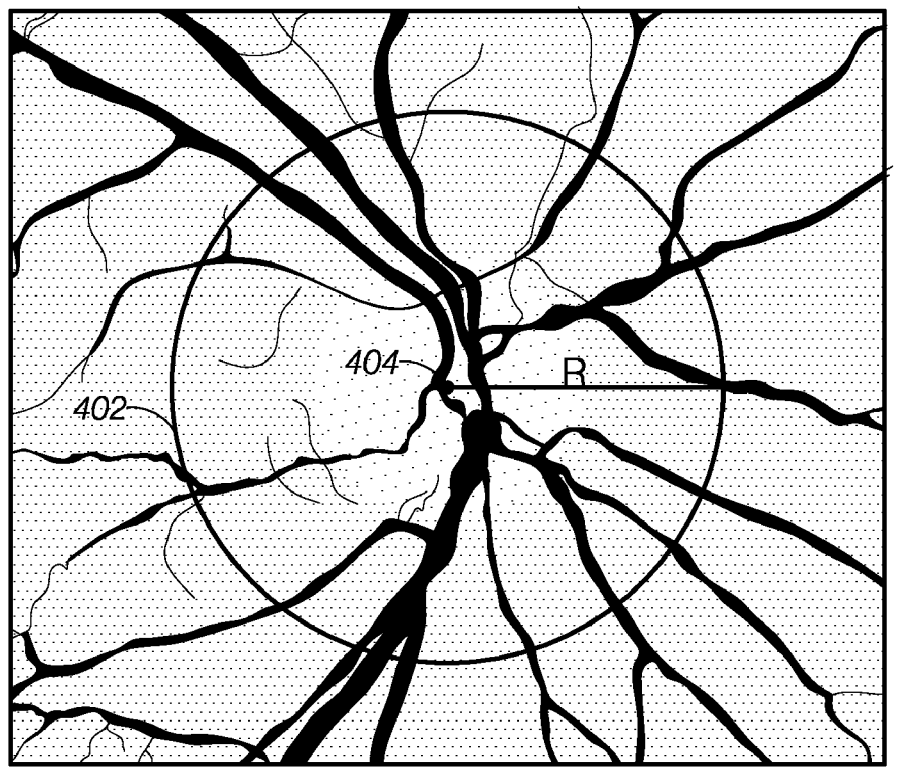
FIG. 4 shows a an example drawing to illustrate the input retinal image, the optic disk center, and the analysis circumference; as well as the linear profile gray level representation around the analysis circumference, where deeper valleys correspond to vessels.
Figure 4:
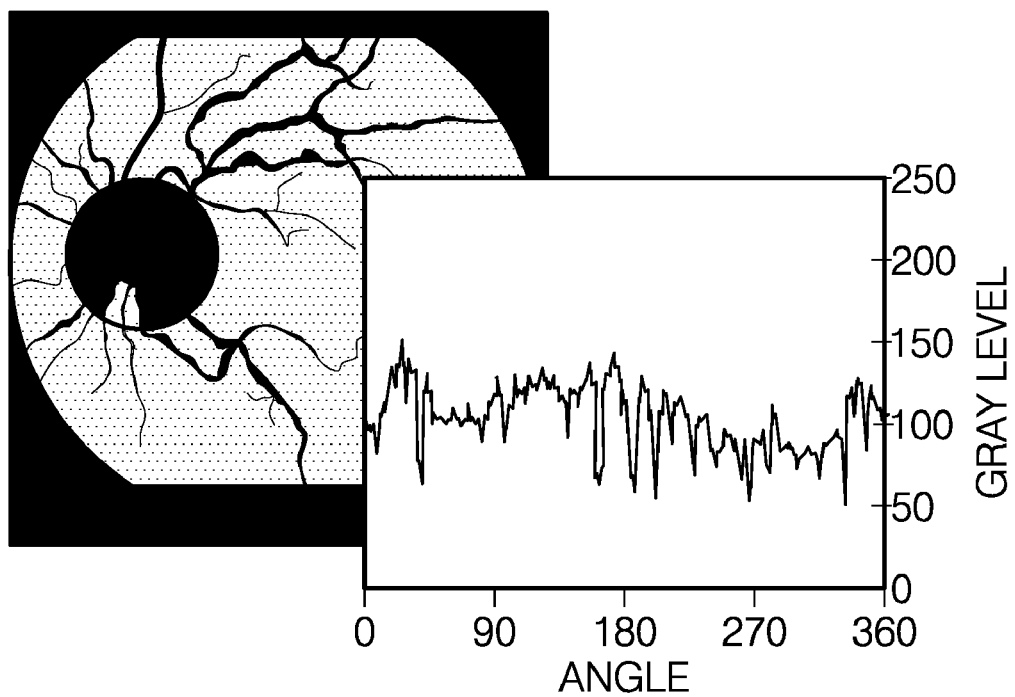

The vascular tree of the eye is inherently radial. Consequently, AVR computation involves vessels located at a concentric areas (analysis circumference) 402 around the optic disk center 404, as shown in FIG. 4.

According to one embodiment, the method includes a step to automatically locate the optical disk based on the fuzzy circular Hough transform or using active contours. In an alternative embodiment, the system is semi-automatic and allows a medical professional such as an ophthalmologist to point out the optic disk center 404 and the analysis circumference radius. According to this embodiment, the system allows the medical expert to select the optic disk center 404 and choose the diameter and number of radial concentric circles 402. In a third embodiment, both options are available and the method can be fully automatic or semi-automatic based on the requests of the operator (i.e. based on the operator instructions 12).

B. Detecting Vessels

Figure 5:
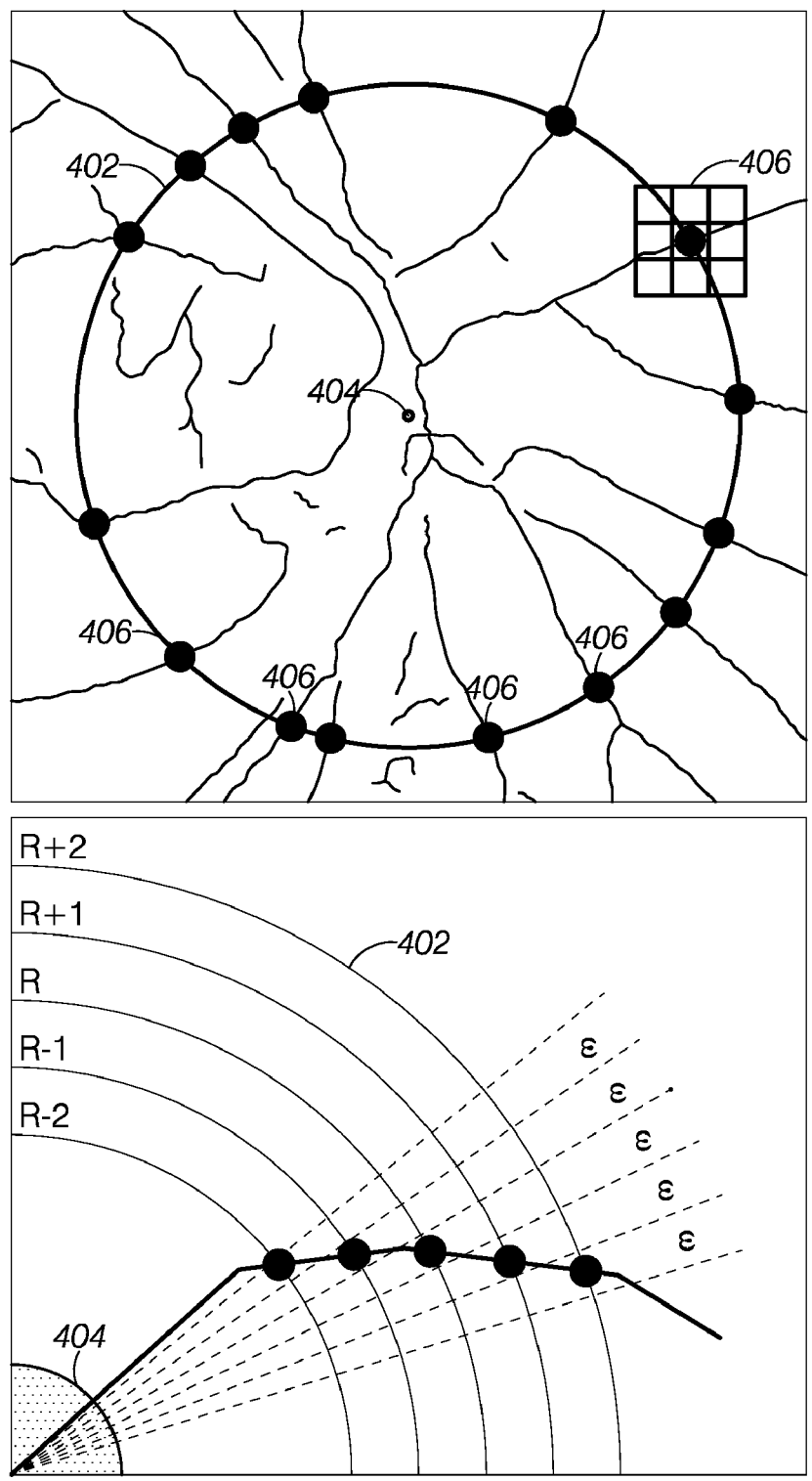
FIG. 5 shows an example to illustrate the intersections between each crease and the analysis circumference and the procedure for vessel detection through crease tracking.

According to one embodiment, as shown in FIG. 5, vessel detection 104 is based on the automatic extraction of creases, which are a fast and robust way to obtain a representation of the whole retinal vascular tree. FIG. 5 shows an example to illustrate the intersections 406 (candidate point vessels) between each crease and the analysis circumference 402 and the procedure for vessel detection through crease tracking.

A crease can be defined as a continuous zone of points on the image, shaping a highest or a lowest level in its environment. When images are seen as landscapes, blood vessels can be considered as ridges or valleys, that is, regions which form an extreme and tubular level on their neighborhood.

According to one embodiment, the method computes the creases based on a geometric based approach, the Level Set Extrinsic Curvature (LSEC). Given a function $L:R^d \to R$, the level set for a constant 1 consists of the set of points $\{x|L(x)=1\}$. For 2D images, L can be considered as a topographic relief or landscape and the level sets are its level curves. Negative minima of the level curve curvature n, level by level, form valley curves, and positive maxima ridge curves. The 2D LSEC can be expressed in terms of the derivatives of L according to tensorial calculus as:

$$\kappa = (2L_x L_y L_{xy} - L_y^2 L_{xx} - L_x^2 L_{yy})(L_x^2 + L_y^2)^{-\frac{3}{2}} \quad (1)$$

where $$L_\alpha = \frac{\partial L}{\partial \alpha}, L_{\alpha\beta} = \frac{\partial^2 L}{\partial \alpha \partial \beta}, \alpha, \beta \in \{x, y\}$$

The LSEC approach produces a large dynamic range of values, but only a few points at the upper and lower bounds indicate curvature. In some cases, these points, called outliers, are not as centered as other points, also with a high value but not labelled as outliers. As a consequence, the computed creases are not centered in the structures. Additionally, the usual discretization of LSEC is ill-defined in an important number of cases, giving rise to unexpected discontinuities at the center of elongated objects. This is due to the very local definition of the LSEC, which is not appropriate for the discrete domain. These issues are solved through the improvement of this method by a multilocal solution, the Multi-local Level Set Extrinsic Curvature (MLSEC). The results obtained with MLSEC can be enhanced by pre-filtering the image gradient vector field using structure tensor analysis and by discarding creaseness at isotropic areas by means of the computation of a confidence measure.

In 2D, the level curve curvature n can be defined through its geometric relationship with the slope lines, which are the lines integrating the gradient vector field w and are, therefore, orthogonal to the level curves. Due to the orthogonality, when level curves are parallel straight lines, slope lines are also parallel and straight, and when the level curves bend, the slope lines diverge/converge. This is the reason why divergence operator is used to calculate maximal/minimal curvatures of the level curves.

If we denote as $\overline{w}$ the normalized gradient vector field of $L:R^d \to R$, the curvature for d—dimensionality can be defined as:

$$\kappa_d = -\text{div}(\overline{w}) \quad (2)$$

In 2D (d=2), lets take the point x where the divergence of a 2D vector field u has to be computed. Let C be a simpled closed curve in $R^2$ parameterized by l, which encloses the point x; let n be its unitary normal vector and ω the area enclosed by C. Then the divergence of u at x can also be defined as:

$$\text{div}(u) = \lim_{\omega \to 0} \frac{1}{\omega} \int_c u^t \cdot n \partial l \quad (3)$$

According to one embodiment, local definition of $\kappa_d$ is substituted by a multi-local definition based on a discretized version of eq. 3, where the multi-locality is achieved by assuming that a neighborhood W around a point x or, analogously, its closed boundary C, is a selectable parameter. That is, to compute $\text{div}(\overline{w})$ at x the gradient vectors along the path C around the point x will be used. For a given dimension d we will denote by $\overline{\kappa}_d$ the MLSEC based on eqs. 2 and 3, given a selected C. MLSEC operator for a discrete domain is defined as a summation for all the neighbors in the area ω enclosed by C:

$$\overline{\kappa}_d = -\text{div}(\overline{w}) = -\frac{d}{r} \sum_{i=1}^{r} \overline{w}_i^t \cdot n_i \quad (4)$$

where r stands for the selected adjacency and will be given by the specific C (for example, in 2D we can choose 4 or 8 adjacency), and d is the dimensionality of the space.

Once $\overline{\kappa}_d$ has been established as a good creaseness measure, it can still be improved by pre-filtering the image gradient vector field in order to increase the degree of attraction/repulsion at ridge-like/valley-like crease. This can be done by the structure tensor analysis.

In the d-dimensional space, given a symmetric neighborhood of size $\sigma_I$ centered at a given point x, namely $N(x; \sigma_I)$, the structure tensor M is defined to be the symmetric and semi-positive definite d×d matrix $$M(x;\sigma_I) = N(x;\sigma_I) * (w(x) \cdot w^t(x)) \quad (5)$$

where the convolution "*" is element wise.

The eigenvector which corresponds to the highest eigenvalue of $M(x; \sigma_I)$, $w'(x; \sigma_I)$, yields the dominant gradient orientation at x, where "dominant" means inside the neighborhood $N(x; \sigma_I)$. A suitable choice for the neighborhood $N(x; \sigma_I)$ is a d-dimensional Gaussian, $N(x; \sigma_I) = G(x; \sigma_I)$. The eigenvector which corresponds to the lowest eigenvalue of $M(x; \sigma_I)$, namely $v'(x; \sigma_I)$, yields the dominant orientation at x, which is perpendicular to the dominant gradient orientation. This analysis assumes that within each neighborhood there is a single dominant orientation. In order to verify this assumption, a normalized confidence measure is introduced: to each orientation we associate a real value $C \in [0, 1]$ which can be computed from the eigenvalues of the structure tensor. Similarity of the eigenvalues of the structure tensor implies isotropy, and, as a result, C should be close to zero. Therefore, denoting by $\lambda_1, \ldots, \lambda_d$ the eigenvalues of M, a logical choice consists of testing whether the sum of quadratic difference of them:

$$\lambda_\Delta(x;\sigma_I) = \sum_{i=1}^{d} \sum_{j=i+1}^{d} (\lambda_i(x;\sigma_I) - \lambda_j(x;\sigma_I))^2 \qquad (6)$$

exceeds a predefined threshold c characteristic for $\lambda_\Delta$ in the structure we want to enhance. A suitable function is:

$$C(x;\sigma_I;c) = 1 - e^{-\lambda_\Delta(x;\sigma_I)^2/2c^2} \qquad (7)$$

C. Crease Extraction

The method includes a technique for crease extraction 106. In one particular embodiment of the method, and without limitation, the creases and valleys are computed according to the following method steps as shown in FIG. 3:

1. Compute the gradient vector field w and the structure tensor field M 302. The method uses a Gaussian neighborhood to compute M:

$$M(x;\sigma_I) = \begin{pmatrix} s_{11}(x;\sigma_I;\sigma_D) & s_{12}(x\sigma_I;\sigma_D) \\ s_{12}(x;\sigma_I;\sigma_D) & s_{22}(x;\sigma_I;\sigma_D) \end{pmatrix} \qquad (8)$$

$$s_{11}(x;\sigma_I;\sigma_D) = G(x;\sigma_I) * (L_x(x;\sigma_D)L_x(x;\sigma_D))$$

$$s_{12}(x;\sigma_I;\sigma_D) = G(x;\sigma_I) * (L_x(x;\sigma_D)L_y(x;\sigma_D))$$

$$s_{22}(x;\sigma_I;\sigma_D) = G(x;\sigma_I) * (L_y(x;\sigma_D)L_y(x;\sigma_D))$$

The new parameter $\sigma_D$ denotes the standard deviation of the Gaussian kernel involved in the differentiation process needed to compute w in a well-posed manner. The parameter $\sigma_D$ is called the differentiation scale in opposition to $\sigma_I$ which is called the integration scale. The differentiation scale is tuned to the size of the objects whose orientation has to be determined, while the integration scale is tuned to the size of neighborhood in which an orientation is dominant.

2. Perform the eigenvalue analysis of M 304. According to one embodiment, the normalized eigenvector w' corresponding to the highest eigenvalue gives the predominant gradient orientation. In the structure tensor analysis, opposite directions are equally treated. Thus, to recover the direction w' is put in the same quadrant in 2-D as w. Then, the new vector field $\tilde{w}$ is obtained:

$$\tilde{w} = \text{sign}(w'^t \cdot w)w' \qquad (9)$$

where $$\text{sign}(p) = \begin{cases} +1 & \text{if } p > 0 \\ -1 & \text{if } p < 0 \\ 0 & \text{if } p = 0 \end{cases} \qquad (10)$$

in order to reinforced the attraction/repulsion of vectors.

3. Compute an enhanced creaseness measure 306. According to one embodiment, the enhanced creaseness measure 306 MLSEC-ST as:

$$\tilde{\kappa}_d = -\text{div}(\tilde{w}) \qquad (11)$$

4. Compute a confidence measure C to discard creaseness at isotropic areas 308. In this way, product of the confidence with the result of the MLSEC ($\tilde{\kappa}_d C$) has a lower response than $\tilde{\kappa}_d$ at isotropic regions, and will be taken as the final creaseness measure.

Once the methodology for crease extraction is established, the parameters involved must be fixed. The retinal image quality is highly variable due to several factors as different contrast levels, different light sources, or the presence of background noise. Even different areas in an image do not share the same characteristics. For this reason, the use of static values for the involved parameters in the crease extraction process is not suitable.

Most of the angiographies do not have an uniform contrast all over the image, since this feature is usually local to some regions. Therefore, the contrast analysis will be performed just in the region of interest, that is, over the analysis circumference. The grey level of the pixels in the analysis circumference is represented in a linear way, which we call linear profile, as shown in FIG. 4. Both veins and arteries should have darker grey levels in the image, so they must appear as valleys in the linear profile representation. At this point, a higher contrast in the research region implies deeper valleys in the vessels' profile representation.

The m extreme values $\text{ext}_i$; $i=1, \ldots, m$ of the linear profile are used to determine the contrast: the minima position will be around the middle of valleys and the maxima position will be between valleys. A large variability among these values shows a high quality contrast whereas a small variability shows a low quality contrast.

According to a particular embodiment, and without limitation, the computation of the variability has several steps. First, a median filter is applied to the vessels' profile in order to reduce noise from the original image. Afterwards, extreme values, that is, maxima and minima, are located in the smoothed vessels' profile. An irregular signal is obtained connecting the extreme values. Thus, the contrast estimation is given by the fluctuations among maxima and minima: higher fluctuations imply higher contrast in the research circumference. The variability is computed as follows:

$$\text{variability} = \frac{1}{m} \sum_{i=1}^{m} |\mu - \text{ext}_i| \qquad (12)$$

where m is the number of gray extreme values $\text{ext}_i$ and $\mu$ is their mean value.

The variability is used to establish empirically three categories of image contrast, low (variability $\geq 0$), normal (variability $\geq 12$), and high (variability $\geq 24$). After that, the parameter set can be empirically adjusted for each category.

According to one embodiment, the crease extraction process has a preliminary step in which the image variability is computed in order to classify the image into one of the three contrast categories. After that, the creases are extracted using the parameter set of the selected category. Thus, the crease extraction process will lead to similar results independently of the image quality.

According to one embodiment, as shown in FIG. 5, once the crease image is computed, the intersections between each crease and the analysis circumference are marked as the candidate vessels. In order to distinguish between vessels and noise a crease tracking process is performed. The crease tracking is performed in 2n+1 concentric circumferences of radii [r−n, r+n] around the radius r analysis circumference. For each circumference, a set of candidate vessel points is selected, $CV_r = \{cv_{ir}\}$. To obtain this set of points, a 3×3 pixel window is centered in each point of the analysis circumference in the crease image, as depicted in FIG. 5. If the highest grey level of this window is greater than a threshold, the point will be a new candidate $cv_{j_r}$. This way, points in low level creases corresponding to noise segments will be discarded, and only points in high level creases corresponding to vessels will not be removed.

Once the candidate points $CV_r$ have been selected for each circumference, the next step consists of linking the candidate points of consecutive circumferences to form blood vessels. A point $cv_{j_{r-1}}$ is linked to an adjacent point $cv_{k_r}$ if the angle θ between them is less than a threshold ε, as shown in FIG. 5.

According to one embodiment of the method, and without limitation, for each pair of consecutive points of a vessel l, a vote is added to l. At the end of the tracking, only the vessels with more than $$\frac{2n}{3}$$

votes are considered, where 2n+1 is the number of circumferences analyzed.

D. Vessel Measurement

After detecting the vessels, the method performs the measurement of vessel diameters 208 over the analysis circumference. According to one embodiment, vessel measurement is based on a snake or active contours. A snake or active contour is defined as a polygonal surface that evolves within the image until it matches the boundaries of a target object. Its shape is directed by forces and it becomes stable when it minimizes its energy function, that is, when the snake reaches the target object.

The snake is defined as v(s)=[x(s), y(s)], where x(s), y(s) are x, y coordinates along the contour and s∈[0, 1] is the parameter domain. The energy functional to be minimized is:

$$\int_0^1 E_{snake}(v(s))ds = \int_0^1 E_{int}(v(s))ds + \int_0^1 E_{ext}(v(s))ds \quad (13)$$

where $E_{int}$ represents the internal energy, which controls the flexibility and elasticity of the snake, and $E_{ext}$ is the external energy which moves the snake toward the target objects.

According to one embodiment of the method, the proposed snake model used is adapted in order to use specific knowledge of the domain. The adaptation includes the shape, the energy terms which drive the growing direction, and the seed, that is, the initial contour. The snake initialization is an important issue because the final adjustment depends on the initial contour. In one embodiment, the initial contour is the crease piece from the lowest to the highest circumference used in the previous tracking step. The seed of the proposed model consists of two parallel chains of nodes placed at both sides of the crease. The number of initial nodes of a snake $S_i$ is $N_i=2C_i/R$, where $C_i$ is the number of points in the crease and R∈[3, 15] is a constant parameter which controls the sampling, that is, the model resolution.

Figure 6:
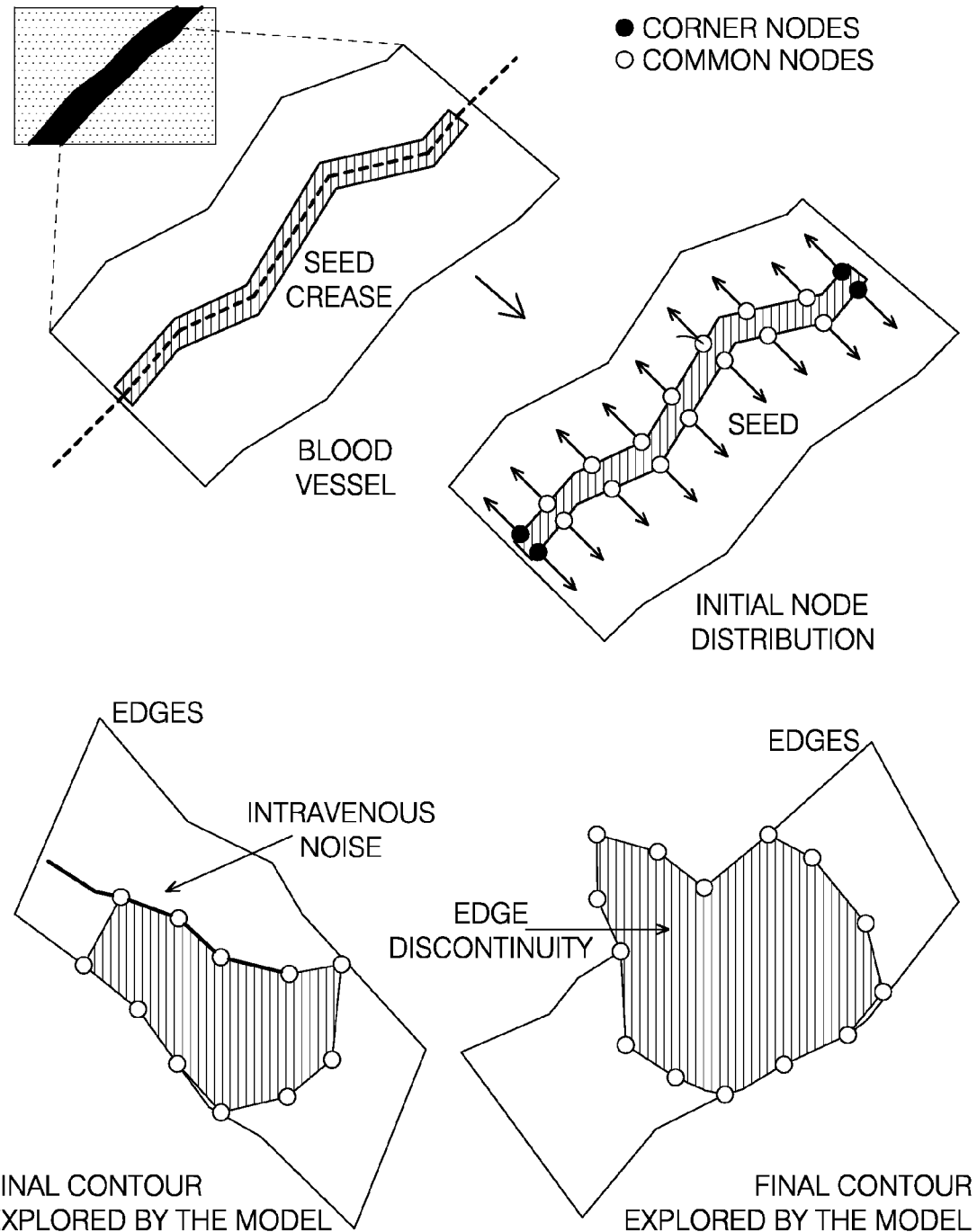
FIG. 6 shows an example to illustrate the vessel measurement method.

The general profile of the vascular structures is like a pipe which keeps almost a constant orientation. For this reason, the direction and orientation of every snake vertex can be pre-established. The direction must be perpendicular to the seed angle and does not change during the model deformation. The seed angle is computed using the points of the crease located at both ends of the crease segment. The way of the movement is from the model seed to the vessel edge. There are also two kind of nodes in the model: the common nodes and the corner nodes as shown in FIG. 6. Common nodes fit the vessel edges whereas corner nodes are adjusted to the corners of the piece of vessel that is being measured. FIG. 6 shows an example to illustrate 1) the initial distribution of snake nodes in the seed including corner nodes and common nodes in a blood vessel; and 2) an example of difficulties resulting in lack of precision after the application of the edge detection filter from intravenous noise where the snake gets trapped by the wrong edge or edge discontinuity where the snake flows outside the vessel.

According to a particular embodiment, and without limitation, the internal snake energy is defined by:

$$E_{int}(v(s))=\alpha(v(s))|v_s(s)|^2+\beta(v(s))|v_{ss}(s)|^2 \quad (14)$$

where the first term is the first order derivative and the second term, the second order derivative. The former makes the snake behave like a membrane and the latter, makes it act like a thin plate. The derivatives are estimated using the finite differences technique. In this embodiment, the parameters have different values for each kind of node $v_i$:

$$\begin{aligned}\alpha(v_i) = \beta(v_i) = 0 &\Leftrightarrow v_i \in \{\text{corner nodes}\}\\ \alpha(v_i) = \hat{\alpha}, \beta(v_i) = \hat{\beta} &\Leftrightarrow v_i \in \{\text{common nodes}\}\end{aligned} \quad (15)$$

where $\hat{\alpha}$ and $\hat{\beta}$ are constant. Corner nodes have no internal energy, which implies the presence of first and second level discontinuities in the contour corners. Consequently, corner nodes fit the vessel edges better because no attraction forces trying to keep them together.

According to one embodiment, the external energy performs the outer forces so it includes the knowledge about the domain. It is defined as:

$$E_{ext}(v(s)) = \gamma\bar{\eta} + \delta E_{dist}(v(s)) + \epsilon E_{grad}(v(s)) + \omega E_{stat}(v(s)) \quad (16)$$

where $\bar{\eta}$ is the dilation pressure, $E_{dist}$ is the edge-driven distance, $E_{grad}$ is the gradient energy, and $E_{stat}$ the stationary energy. γ, δ, ε, and ω are the weights of the previous energies, respectively. The dilation pressure $\bar{\eta}$ is a vectorial magnitude whose main target is to fix the advance direction and orientation of each vertex. The model is able to expand its nodes and reach the energy minimum from the initial configuration due to this term. The edge-driven distance $E_{dist}$ is the distance from each node v(s) to its nearest edge in its advance direction and orientation:

$$E_{dist}(v_i)=\text{dist}(v_i, I_{canny}) \quad (17)$$

where $I_{canny}$ is the Canny edge image computed from the original angiography.

The gradient energy $E_{grad}$ is just a stopping force. The gradient for a node $v_i$ is:

$$\text{grad}(v_i)=I(\hat{v}_i)-I(v_i) \quad (18)$$

where $I(v_i)$ is the grey level on the position of the node $v_i$ in the original image and $I(\hat{v}_i)$ is the grey level on a possible new position of the node in the advance orientation. The gradient energy is defined by:

$$E_{grad}(v_i) = \begin{cases} 0 & \Longleftrightarrow \text{grad}(v_i) \geq 0 \\ \text{grad}(v_i)^2 & \Longleftrightarrow \text{grad}(v_i) < 0 \end{cases} \quad (19)$$

The pixels involved in this computation are smoothed with a median filter in order to prevent noise effects in this term.

The stationary energy $E_{stat}$ is also a stopping force. It measures the adjustment among each node $v_i$ and its neighbors $v_{i-m} \ldots v_{i+m}$, where m represents the m neighbor vertices. This term solves two main issues: the intravenous noise and the edge discontinuities. The former can attract nodes to inner areas of the blood vessel, preventing a correct evolution of the snake. The latter can make the model grow without control so that the estimations of the snake energy will be wrong. The underlying idea of the stationary energy is that there is a high probability that a node will stop if all the adjacent nodes have yet stopped, that is, if all the adjacent nodes have reached the minimum energy. On the contrary, it is not probable that a node will stop if all the adjacent nodes keep on moving. The stationary energy for a node $v_i$ is defined as follows:

$$E_{stat}(v_i) = 1 - \exp\left(\left|\frac{-1}{2m}\sum_{j=i-m}^{j=i+m} E_{ext}(v_j)\right|\right) \quad (20)$$

where $E_{ext}$ is the external energy in a subset of m nodes around the node $v_i$. As a limited function is required in the crease-edge interval, the exponent of this expression must be positive to get a constrained value.

The evolution of the weighting terms involved in the external energy between the crease and the edges involves several steps. The dilation pressure $\bar{\eta}$ is a constant function that expands the mesh towards the edges. The gradient term $E_{grad}$ is null inside the edges, but it grows outside. The edge-driven energy $E_{dist}$ is a linear function with global minima on the vessel edges, and the stationary term $E_{stat}$ is an exponential function which increases rapidly near the vessel edge.

Once the snake energy is minimized, some nodes can be placed outside or inside the vessel edges due to noise or edge discontinuities. This way, the measure of the vessel diameter would be wrong as the snake is not correctly adjusted to the vessel contours. For this reason, the snake needs to be checked in order to detect and correct these wrong nodes.

Since the vascular structures are measured in limited environments of the blood vessels, the final configuration of the model is known. It can be approached through a tetrahedron or even a parallelogram, where two sides are the vessel edges and the other two, the vessel diameter. The information about the topological shape is used to detect wrong nodes in the model, which can be corrected by means of a regression model. This topological check has two steps: the detection of wrong nodes and their correction by means of a linear regression model.

Once the contour has minimized its energy function, there are different ways to locate wrong nodes. These include the distance from the vertex to the seed, which should be reasonable according to the image resolution; the angles between nodes, which must be parallel to the seed angle, and the number of iterations among adjacent nodes, which must be quite similar. Taking into account these conditions, a node $v_i$ will be wrong if:

$$v_i \text{ wrong if } \begin{cases} dist(v_i, \text{seed}) > \lambda_{dist} \\ |ang(v_i, v_{i+1}) - ang(\text{seed})| > \lambda_{ang} \\ \left|iter(v_i) - \frac{1}{k}\sum_{j=1}^{k}(v_j)\right| > \lambda_{iter} \end{cases} \quad (21)$$

where dist is the shortest distance from the seed to the node; $ang(v_i, v_{i+1})$, the angle between adjacent nodes; $ang(\text{seed})$, the angle between the seed and the x axis; $iter(v_i)$, the number of iterations needed to reach the final position of $v_i$; and k the number of nodes in each side of the snake. $\lambda_{dist}$, $\lambda_{ang}$, and $\lambda_{iter}$ are the highest allowed caliber, the threshold to compare angles, and the threshold to compare iterations, respectively.

Figure 7:
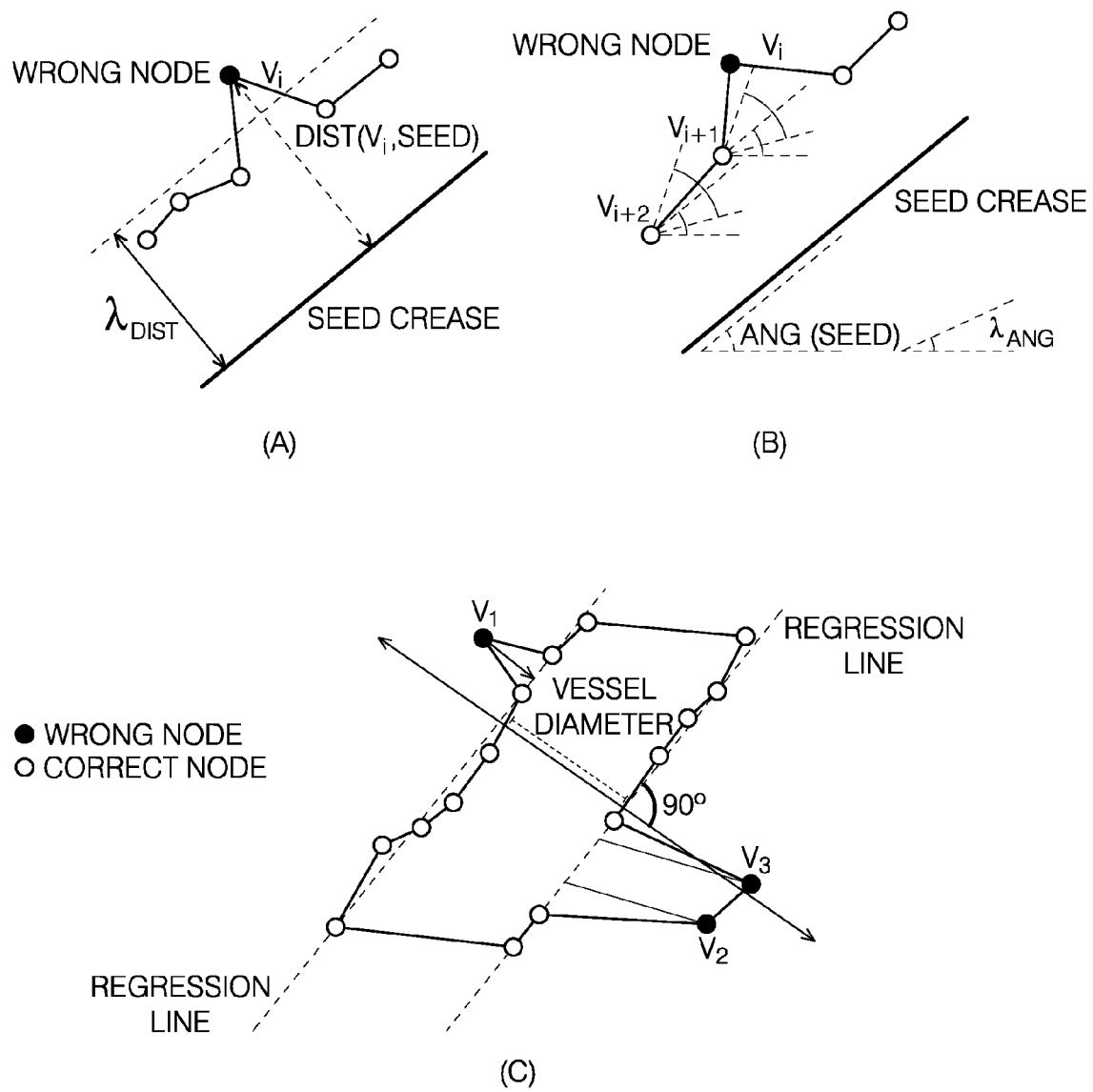
FIG. 7 shows an an example to illustrate the process of detection and correction of wrong nodes from correct nodes.

As soon as the wrong nodes are marked, their positions are corrected using a linear regression model. The right nodes of each side of the vessel are used as the model variables to get both linear regression models, which should be aligned to the vessel margins. FIG. 7 shows an an example to illustrate the process of detection and correction of wrong nodes from correct nodes.

The snake must have a ratio of right nodes and a regression accuracy in order to guarantee appropriate corrections. An exact linear slope is warranted if there is a minimum proportion of nodes in each side of the snake (70%-90%) whereas the regression accuracy can determine whether the model is suitable enough to describe the relationship between the coordinates of the variables. In this way, it is useful to employ the correlation coefficient:

$$R^2 = \frac{s_{xy}^2}{s_x^2 s_y^2} \quad (22)$$

where $s_{xy}^2$ is the model covariation; $s_x^2$, the x variation; and $s_y^2$, the y variation. Values for $R^2$ near 1 indicate an adequate model adjustment, whereas values near 0 show a bad adjustment. According to one embodiment, if $R^2$ is in the interval [0.80; 0.95] the model is considered adequate and the nodes can be adjusted correctly.

Once the vessel diameter is measured from the snake, the computed value must be corrected because the angiography was smoothed in order to discard noise. The standard deviation of the smoothing algorithm often shifts the real edge positions so the performed measurement can be imprecise.

Figure 9:
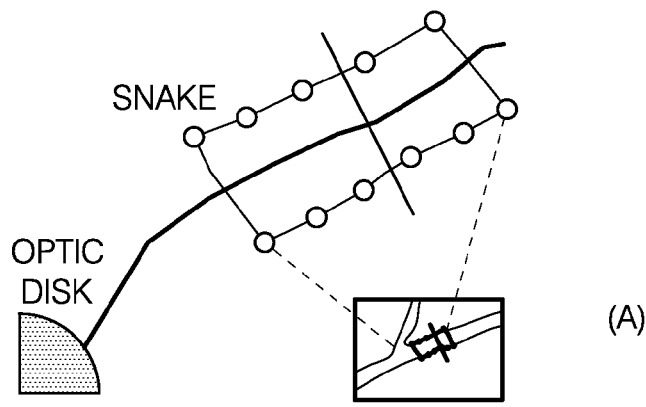
FIG. 9 shows an example to illustrate the computation of the kurtosis.
Figure 9:
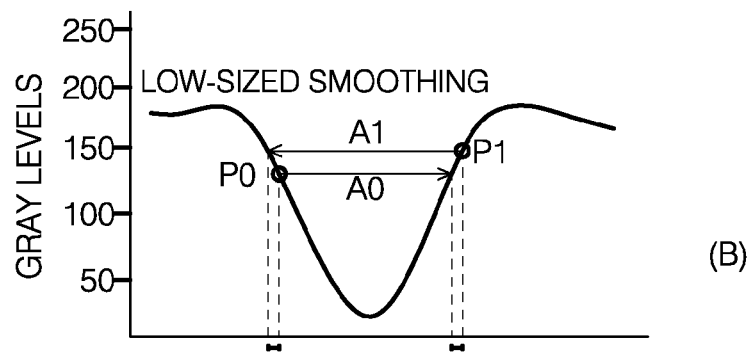
Figure 9:
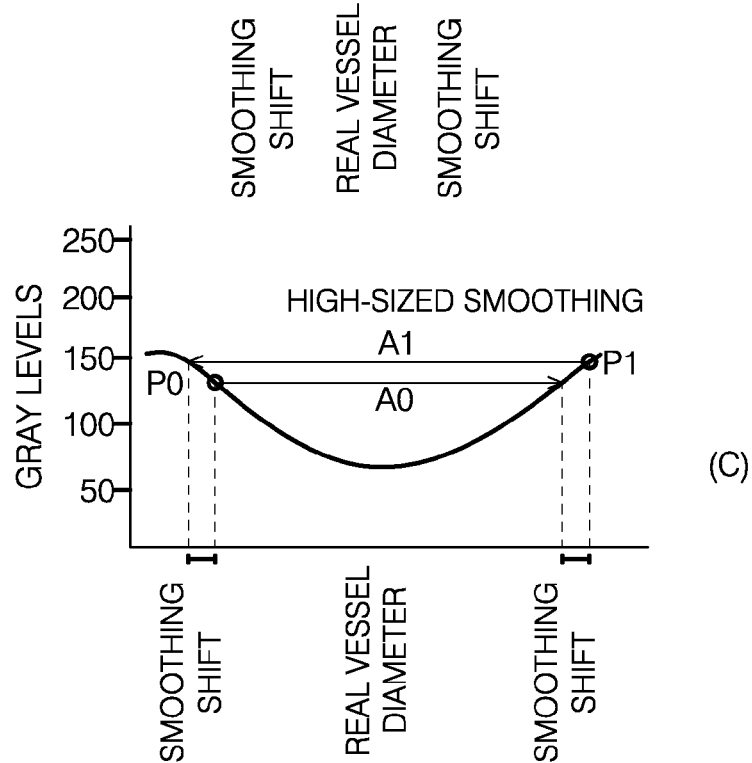

According to one embodiment, in order to improve the measure of the vessel diameter, the method includes a technique to approach the vessel section from a parabolic regression model. Three points are needed for this method: the final boundary position at both sides of the vessel ($p_0$, $p_1$) as well as the crease position. Taking the line from the optic nerve center as the x axis and the grey level of the smoothed image as the y axis, a parabola with a given profile $a_0/a_1$ (kurtosis) is generated. Consequently, the diameter depends both on the smoothing deviation $\sigma$ and the vessel profile. A diameter estimation is given by the intersection among the parabola and the points ($p_0$, $p_1$), but the y value must be recomputed as follows:

$$y_{new} = y_{old}\left[c + (1-c)\frac{a_0}{a_1}\right], c = 1 - \frac{\sigma}{100} \quad (23)$$

where $y_{old}$ is the gray level after smoothing the region, which results in the smoothing filter having a lower effect in the final estimation of the vessel diameter. FIG. 9 shows an example to illustrate the computation of the kurtosis.

D. Computation of the Arteriovenous Ratio

Figure 8:
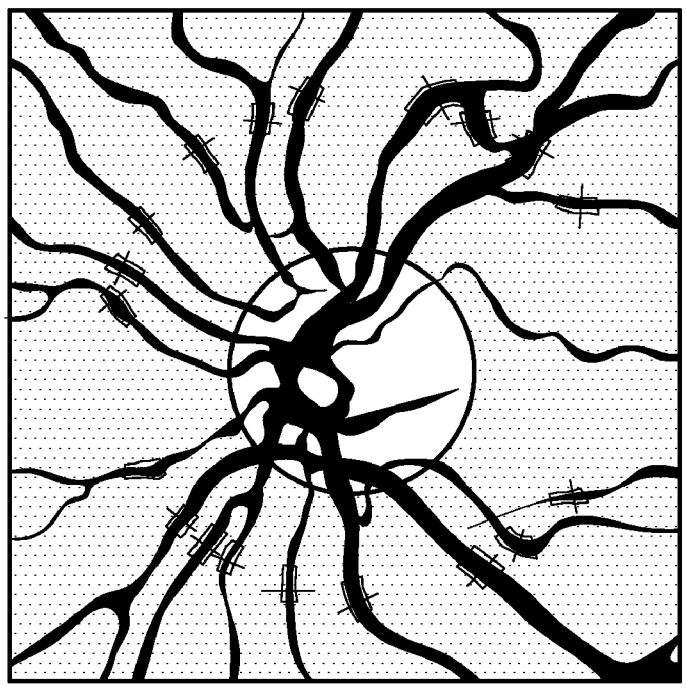
FIG. 8 shows an example to illustrate the resulting snakes after the energy minimization and the topological check in the model.
Figure 8:

Once the vessels are detected and classified 210, according to one embodiment, the AVR is computed 212 as follows:

$$AVR = \frac{\sum C_A}{\sum C_V} \quad (24)$$

where $C_A$ and $C_V$ are the average caliber of the arteries and veins, respectively, found in the analysis area (FIG. 8). In one embodiment of the method, retinal vessel classification 110 is performed automatically based on a color clustering strategy and a vessel tracking procedure based on minimal path techniques. In an alternative embodiment, the system is semi-automatic and allows a medical professional such as an ophthalmologist to perform the classification step with computed aided support. In a third embodiment, both options are available and the method can be fully automatic or semi-automatic based on the requests of the operator.

In alternative embodiments, other clinical parameters beyond the AVR are computed using their direct definition based on the classification of arteries and veins, as well as the vessel calibers. As an example, and without limitation, any metric for summarizing retinal vessel calibers from retinal images is implemented in the system and readily available for reporting. As an example, and without limitation, these clinical parameters include Parr's metric for quantification of the arteriolar caliber, Hubbard's metric for retinal venular caliber quantification, the Parr-Hubbard ratio, central retinal artery equivalent (CRAE) metric, central retinal vein equivalent (CRVE), CRAE to CREV ratio, CRAET (trunk variant), CRAEB (branch variant), AVRT (ratio using CREAET), and AVRB (ratio using CRAEB).

While particular embodiments have been described, it is understood that, after learning the teachings contained in this disclosure, modifications and generalizations will be apparent to those skilled in the art without departing from the spirit of the disclosed embodiments. It is noted that the foregoing embodiments and examples have been provided merely for the purpose of explanation and are in no way to be construed as limiting. While the apparatus has been described with reference to various embodiments, it is understood that the words which have been used herein are words of description and illustration, rather than words of limitation. Further, although the system has been described herein with reference to particular means, materials and embodiments, the actual embodiments are not intended to be limited to the particulars disclosed herein; rather, the system extends to all functionally equivalent structures, methods and uses, such as are within the scope of the appended claims. Those skilled in the art, having the benefit of the teachings of this specification, may effect numerous modifications thereto and changes may be made without departing from the scope and spirit of the disclosed embodiments in its aspects.

E. Medical Apparatus and System

The previous sections described in detail a method for retinal image analysis designed to be implemented in a medical system with one or more processors comprising the method steps of: (a) locating an optical disk on the retinal images and establishing a plurality of circumferences centered at the disk 102; (b) detecting a plurality of vessels within a region defined by said circumferences' radii using a crease-based algorithm 104; (c) extracting a plurality of vessel segments based on a deformable models (snakes) algorithm 106; (d) measuring a plurality of vessel calibers 108; (e) classifying each vessel as a vein and an artery 110; and (f) computing an arteriolar-to-venular (AVR) ratio 112. In order to operate, according to one embodiment and without limitation, the method requires to be implemented in an apparatus containing one or more processing elements 20 (e.g. microprocessors, digital signal processors, microcomputers, or any other processing hardware), one or more memories 22 (e.g. RAM, ROM, storage memory, or any other memory device), one or more input hardware elements for controlling and operating said apparatus (e.g. keyboard, mouse, touch screen, or any other input hardware) 12, and one or more output hardware elements for displaying the results of the analysis 14 (e.g. display or any other output hardware). In particular embodiments, such system includes retinal image acquisition hardware and software to acquire the input retinal images 10 required for said method to perform said retinal image analysis processing steps. Furthermore, such apparatus implementing said method can be part of a larger retinal image analysis system including a web-enabled platform for retinal image analysis. Such system comprises a web-enable platform for operating said system of retinal image analysis and obtaining analysis results remotely. In a particular embodiment, the method is a computer-implemented method that transforms a general purpose computer into a medical apparatus for retinal image analysis. According to one embodiment, the method is embodied as a set of instructions for causing a hardware device having at least one processor or in at least one integrated circuit to perform a method of retinal image analysis. In another embodiment, the method is embodied on a storage medium or on a signal for transmission containing the process steps as a set of instruction for causing a hardware device to carry out the method.

Certain specific details are set forth in the following description and figures to provide a thorough understanding of various embodiments disclosed. Certain well-known details often associated with computing and software technology are not set forth in the following disclosure to avoid unnecessarily obscuring the various disclosed embodiments. Further, those of ordinary skill in the relevant art will understand that they can practice other embodiments without one or more of the details described below. Aspects of the disclosed embodiments may be implemented in the general context of computer-executable instructions, such as program modules, being executed by a computer, computer server, or device containing a processor. Generally, program modules or protocols include routines, programs, objects, components, data structures, etc. that perform particular tasks or implement particular abstract data types. Aspects of the disclosed embodiments may also be practiced in distributed computing environments where tasks are performed by remote processing devices that are linked through a communications network. In a distributed computing environment, program modules may be located in both local and remote storage media including memory storage devices. Those skilled in the art will appreciate that, given the description of the modules comprising the disclosed embodiments provided in this specification, it is a routine matter to provide working systems which will work on a variety of known and commonly available technologies capable of incorporating the features described herein.

The invention claimed is:

1. A method for analysis of a retinal image implemented in a medical system with one or more processors, said method comprising:
    (a) locating an optical disk on said retinal image and establishing a plurality of circumferences;
    (b) detecting a plurality of vessels within a region defined by said circumferences' radii using a crease-based algorithm;
    (c) extracting a plurality of vessel segments based on a deformable models algorithm;
    (d) measuring a plurality of vessel calibers;
    (e) classifying each vessel as a vein and an artery; and
    (f) computing an arteriolar-to-venular ratio from said vessel calibers.

2. The method of claim 1, further comprising computing one or more clinical parameters from said vessel calibers and classification.

3. The method of claim 2, wherein said one or more clinical parameters include computing an arteriolar-to-venular ratio.

4. The method of claim 3, wherein said extracting a plurality of vessels comprises:
   a) computing a gradient vector field and a structure tensor field;
   b) performing eigenvalue analysis of said tensor field;
   c) computing an enhanced creaseness measure; and
   d) computing a confidence measure to discard creaseness at isotropic areas.

5. The method of claim 3, embodied as a set of instructions for causing a hardware device having at least one processor or in at least one integrated circuit to perform retinal image analysis.

6. The method of claim 3, embodied on a storage medium.

7. The method of claim 3, carried on a signal for transmission.

8. The method of claim 2, wherein said computing an arteriolar-to-venular ratio is based on a semi-automatic classification of each vessel.

9. The method of claim 2, wherein said computing an arteriolar-to-venular ratio is based on an automatic classification of each vessel.

10. The method of claim 9, wherein said automatic classification of each vessel is based on a color clustering strategy and a vessel tracking procedure based on minimal path techniques.

11. A medical system with one or more processors for retinal image analysis, comprising:
   (a) means for locating an optical disk on said retinal image and establishing a plurality of circumferences;
   (b) means for detecting a plurality of vessels within a region defined by said circumferences' radii using a crease-based algorithm;
   (c) means for extracting a plurality of vessel segments based on a deformable models algorithm;
   (d) means for measuring a plurality of vessel calibers;
   (e) means for classifying each vessel as vein or as an artery; and
   (f) means for computing the arteriolar-to-venular ratio.

12. The medical system of claim 11, further comprising image acquisition hardware for acquiring said retinal images.

13. The medical system of claim 12, further comprising a web-enabled platform for operating said system of retinal image analysis and obtaining analysis results remotely.

* * * * *